United States Patent [19]

Sabin

[11] 4,351,270

[45] Sep. 28, 1982

[54] TERRARIUM/AQUARIUM

[76] Inventor: Darrell L. Sabin, 1822 NE. 47th, Portland, Oreg. 97213

[21] Appl. No.: 192,414

[22] Filed: Sep. 29, 1980

[51] Int. Cl.³ .............................................. A01K 64/00
[52] U.S. Cl. ............................................. 119/5; 47/69
[58] Field of Search ................... 119/2, 3, 4, 5; 47/69; 165/132; 126/417

[56] References Cited

U.S. PATENT DOCUMENTS

| 147,849 | 2/1874 | Leslie | 119/5 X |
|---|---|---|---|
| 3,374,771 | 3/1968 | Michie et al. | 119/3 X |
| 3,556,199 | 1/1971 | De Groote | 165/108 X |
| 3,863,605 | 2/1975 | Gallup | 119/3 |
| 3,998,186 | 12/1976 | Hodges | 119/2 |
| 4,206,745 | 6/1980 | Gilgen | 126/417 X |

FOREIGN PATENT DOCUMENTS 2416365 10/1975 Fed. Rep. of Germany .......... 119/5

Primary Examiner—Paul J. Hirsch
Assistant Examiner—Robert P. Swiatek
Attorney, Agent, or Firm—Kolisch, Hartwell & Dickinson

[57] ABSTRACT

A terrarium/aquarium having a light-transparent shell forming a moisture-retaining enclosure about a region containing plant growth medium. Transparent jackets mounted on the shell form with exterior wall portions of the shell, water-bearing chambers for raising fish. Water in each chamber is separately circulated and filtered, with the circulated water flowing through a conduit extending through the medium to exchange heat therewith.

2 Claims, 4 Drawing Figures

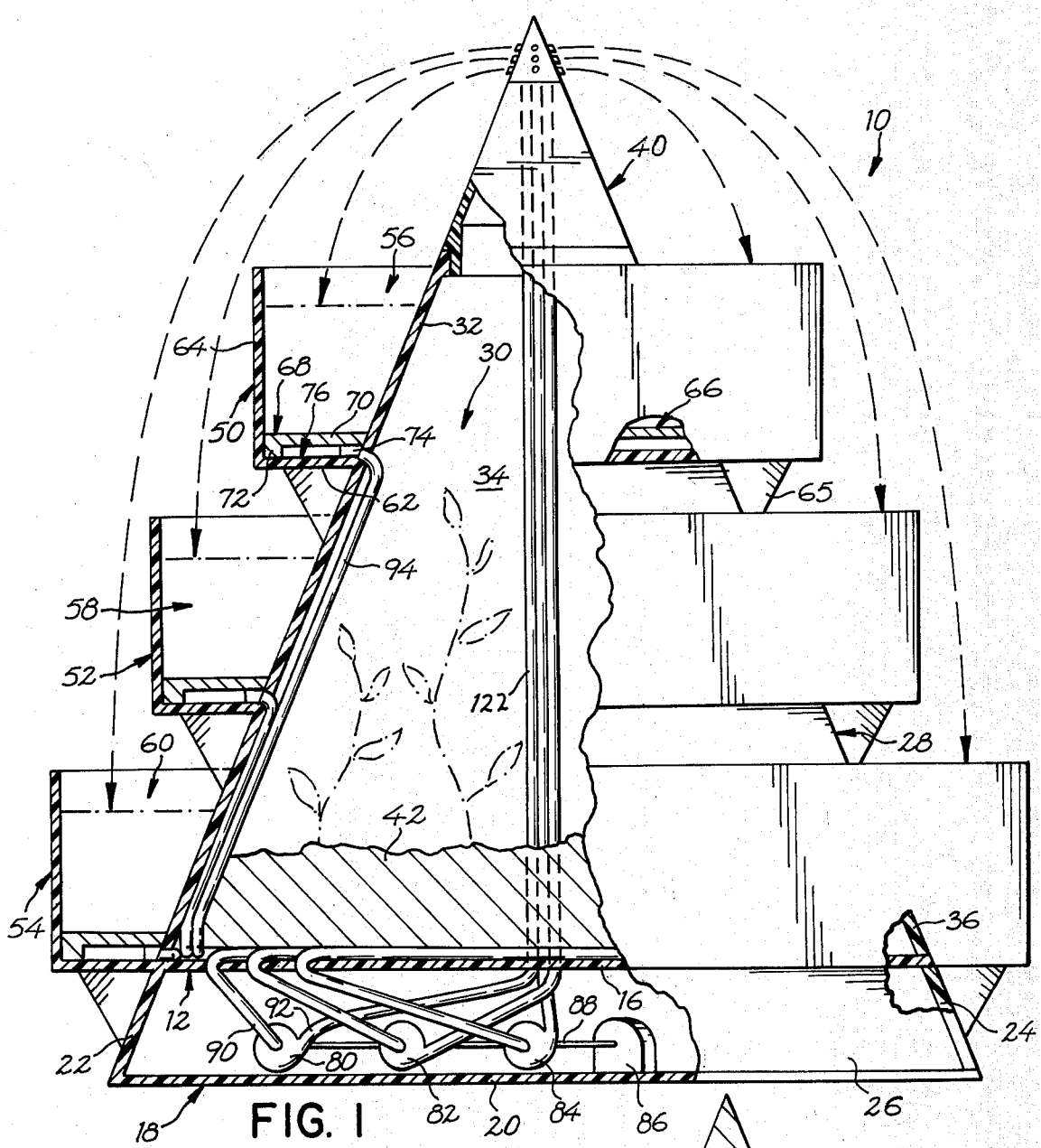
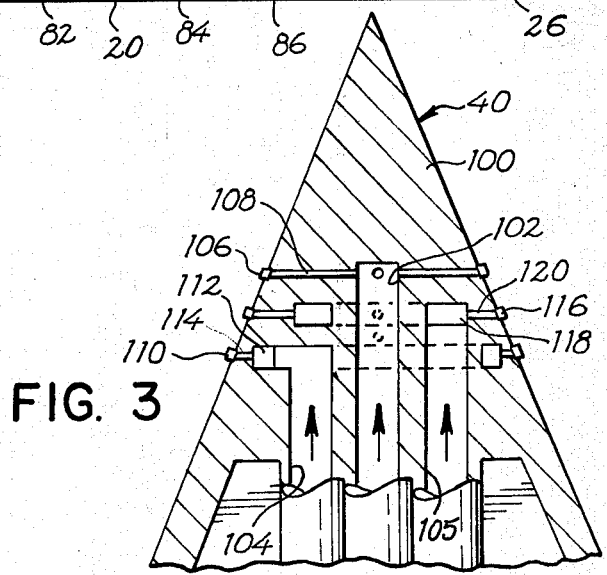

TERRARIUM/AQUARIUM

BACKGROUND AND SUMMARY

The present invention relates to fish-raising apparatus, and more particularly, to an apparatus combining a terrarium and an aquarium.

In many species of fish, the rate of growth and development can be accelerated by elevating the temperature of the hatchery waters. This suggests that fish hatchery economics can be improved by employing various solar water heating expedients known in the art. Thus, for example, water in a ground hatchery pond might be circulated and allowed to trickle over a solar-collecting panel located near the pond. One problem with this approach is that during night hours, the solar-heated water may drop several degrees in temperature as heat is given off to the relatively cool ground surface. Large temperature variations in the hatchery water can produce trauma in the immature fish, retarding their growth and thus defeating the reason for heating the water.

One objective then in a solar-heated hatchery pond is to maintain the hatchery water at an elevated, but substantially constant temperature over a diurnal cycle. This objective is accomplished in the present invention by providing aquarium chambers which are positioned above ground level, with water in the chambers being circulated through conduits arranged to exchange heat with a heat-reservoir which is effectively insulated from ground and ambient air within a terrarium.

One general object of the present invention, is to provide an aquarium/terrarium which promotes fish and plant growth by operating at elevated and fairly constant temperatures.

Another object of the invention is to provide such a terrarium/aquarium which can be constructed on a wide range of scales, varying from a relatively small scale suitable for indoor use, to a relatively large scale suitable for plant and fish farming.

Another object of the invention is to provide in such a terrarium/aquarium, plural filtering units which are easily placed into and removed from an aquarium chamber, and which cooperate therewith to provide a large-area water filter.

Still another object of the invention is to provide such a terrarium/aquarium which is visually attractive.

These and other objects and features of the present invention will become more fully apparent when the following detailed description of preferred embodiments of the invention is read in connection with the accompanying drawings, wherein:

FIG. 1 is a side, partially cutaway view of a terrarium/aquarium constructed according to one embodiment of the present invention;

FIG. 3 is an enlarged sectional view of the apex region of the terrarium/aquarium in FIG. 1.

DETAILED DESCRIPTION OF THE INVENTION

Figure 2:
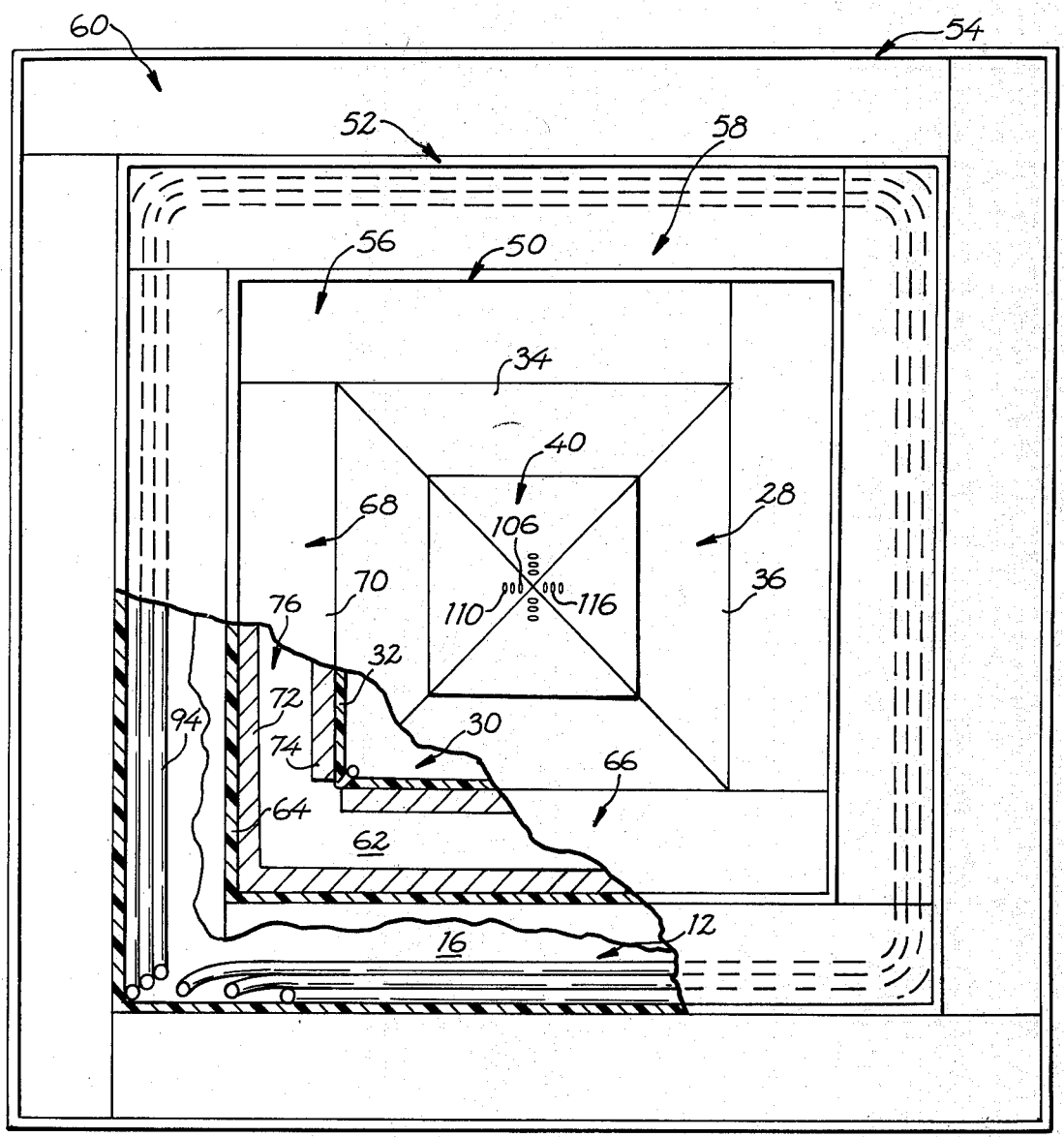
FIG. 2 is a top view of the terrarium/aquarium shown in FIG. 1, with portions cutaway.

Looking now at the figures, and first particularly at FIGS. 1 and 2, there is shown at 10 an apparatus constructed according to a preferred small-scale embodiment of the invention. A bottom support 12 in the apparatus includes a floor 16 and a stand 18 which supports the floor above the surface on which the apparatus rests. The floor and a base 20 in the stand have square planar dimensions, and are joined along three of their four associated edges by converging panels, such as panels 22, 24 (FIG. 1) in the stand. A detachable panel 26 (FIG. 1) covers the remaining angled surface between floor 16 and base 20, providing access to the region between the floor and the stand. Floor 16 is preferably formed of a thick-walled, relatively heat-insulated sheet material, such as plexiglas.

A light-transmissive shell 28 having the general pyramidal shape seen in FIGS. 1 and 2 is mounted on support 12 and forms therewith an enclosed terrarium region 30 in the apparatus. The shell is constructed of four, generally trapezoid-shaped transparent walls, such as walls 32, 34 and 36 seen in FIGS. 1 and 2. The walls are joined and sealed along their common edges. Where shell 28 is constructed of a transparent plastic sheet material, such as plexiglas, the edges can be joined and sealed by a suitable solvent, such as dichlorethane. Where the shell is formed of glass panels, these can be heat-fused at their edges. The lower edges of the walls forming shell 28 are suitably secured to floor 16.

Figure 4:
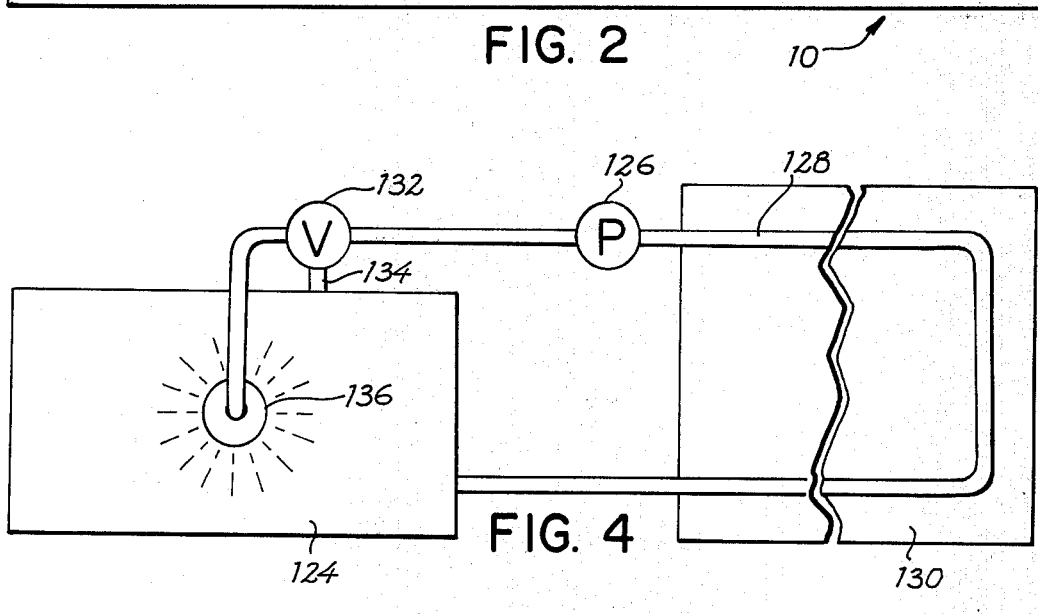
FIG. 4 is a diagrammatic view of the heat-exchange system in a terrarium/aquarium constructed according to another embodiment of the invention.

The four walls in shell 28 are inwardly flanged at their upper edges to form a collar for receiving thereon the lip of a pyramidal cap 40 forming the crown of the shell. Cap 40, which is also referred to herebelow as access means, is detachable from lower portions of shell 28 to provide access to region 30. Water nozzles located on cap 40 will be described below with reference to FIG. 4. Shell 28 has typical height and side-to-base dimensions of about 3 feet each.

Floor 16 is covered with a layer of moistened soil 42, the depth of such layer in region 30 being sufficient to support the growth of desired plants. layer 42, in addition to serving as a plant growth medium, also acts as a heat reservoir to receive heat from and release heat to water in aquaria chambers now to be described, and is also referred to herebelow as heat-reservoir means.

Three jackets 50, 52, 54 mounted at vertically spaced intervals on shell 28, form therewith three successively larger water-bearing chambers 56, 58, 60, respectively. Jacket 50, which is representative, includes a bottom plate 62 dimensioned to extend along each of the side walls in shell 28m projecting radially outwardly therefrom, and four upright side walls, such as wall 64. Jacket 50 preferably is formed as a unitary fused or molded member which, in the construction of apparatus 10, is placed over the top of shell 28 and sealed to the four walls thereof to produce a water-tight chamber. Gussets, such as gusset 65 (FIG. 1), serve to support the jackets on the shell.

Each chamber in apparatus 10 is provided with a filter, such as filter 66, in chamber 56. Filter 66, which is representative, is composed of four identical filter units, such as unit 68, arranged in the end-to-end configuration shown in FIG. 2 to cover the bottom of the chamber. Unit 68 includes filter pad 70 having the rectangular cross section seen in FIG. 1, and a pair of supporting strips 72, 74 extending along opposed side edges and one end edge of the pad, as seen in FIG. 2. The filter unit is dimensioned to seat within the lower region of chamber 56 in the manner shown in FIG. 1, with pad 70 extending between the two walls forming the chamber. The filter unit forms with the lower surface forming chamber 56, an elongate passageway 76, seen in FIGS. 1 and 2. This passageway communicates, at its opposed ends, with similar passageways formed by adjacent filter units, there thus being formed a continuous, four-sided passageway extending about the lower region of the chamber. The filter units, such as unit 68, are preferably integrally formed of a rigid, water-permeable material, such as porous or sintered polyethylene.

Water in chambers 56, 58, 60 is circulated by pumps 80, 82, 84, respectively. These pumps, which are located in stand 18 as seen in FIG. 1, are powered by a drive unit 86 located in the stand and connected to each of the pumps through a drive shaft 88. Pump 80, which is representative, has an inlet and an outlet indicated at 90, 92, respectively in FIG. 1. The pumps are equipped with conventional flow-rate adjustment controls.

Filters in the three chambers are connected to associated pumps by conduits, such as conduit 94 connecting filter 66 in chamber 56 to pump 80. As seen best in FIG. 2, the three conduits are looped substantially about the outer edge regions of floor 16 before reaching the associated pumps. The conduits and in particular, the looped portions thereof are formed of heat-conductive tubing, such as copper tubing. Conduits, such as conduit 94, are also referred to herein as conduit means, and the conduit means and associated pumps, as means for circulating water in the chambers.

Water from the three pumps is returned to the associated chambers through the above-mentioned water nozzles located near the top of cap 40. With reference to FIG. 3, cap 40 terminates at its apex region in a cone 100 having three bores 102, 104, 105 formed therein. Bore 102 communicates with each of four upper nozzles, such as nozzle 106, through radially extending conduits, such as conduit 108. Bore 104 communicates with each of four lower nozzles, such as nozzle 110, through a circumferential channel 112 and radially extending conduits, such as conduit 114, connecting this channel to associated nozzles. Similarly, four intermediate-level nozzles, such as nozzle 116, are fed from bore 105 which is connected to the nozzles through a circumferential channel 118 and conduits, such as conduit 120, extending radially therefrom.

The three bores in member 100, such as bore 104 are connected to associated pumps, such as pump 80, through tubes, such as tube 122. These tubes are preferably flexible hoses and are dimensioned in length to provide enough slack so that cap 40 may be lifted out of the collar in which it normally sits and placed at an off-center position to permit access to the terrarium region of the apparatus.

In operation, the three water-bearing chambers are filled with water, typically to a height such as indicated by dash-dot lines in FIG. 1. The usual aquarium food and mineral supplements may be added to the water. In this regard, it is noted that water in each chamber is circulated separately, i.e., as an independent system. This feature permits different salt and nutrient environments to be maintained in each of the three chambers, affording the possibility of raising in the different chambers, fish having unique nutrient or salt-osmotic requirements.

Water in the three chambers is continually filtered, during pump operation, by passage through filter pads in the above-described filters. Since filtration occurs substantially along the entire lower portion of each chamber, the amount of filter debris accumulating in any one area of the total filter surface is relatively small. Accordingly, the filters will operate over extended periods without requiring changing or cleaning. Further, to simplify the general aquarium maintenance required, it is contemplated that the filter units in the apparatus be inexpensive disposable units which can be replaced periodically. Alternatively, the filter units may be removed and cleaned by conventional methods.

Filtered water from the aguaria chambers moves through associated conduits, such as conduit 94, through the lower region of the soil layer, exchanging heat therewith, and is then returned to the associated chambers through the spray nozzles located on cap 40. These nozzles are aimed to direct their spray into associated chambers, as can be appreciated with reference to FIG. 1. The output of each pump is adjustable individually, as noted above, to produce fluid sprays of the desired reach. The spray nozzles also serve to aerate the return water, and provide an attractive decorative effect.

Describing now heat-conserving and heat-exchanging features of the invention, during daylight hours, water in the aguaria chambers is heated by solar energy, with a portion of this heat being transferred to the lower region of layer 42 through heat transfer from the water circulation conduits. The soil layer, being relatively insulated from the surface supporting the terrarium/aquarium, and also from ambient air, thus serves as a relatively isolated heat sink through which heat from solar-heated water in the aquaria chambers can be transferred. During nighttime hours when water in the aquaria chambers begins to cool through evaporative processes and through contact with the cooler ambient air, a portion of the stored heat in soil layer 42 is transferred to the chambers to help maintain water temperatures therein fairly constant over a diurnal period.

In a larger-scale embodiment of the invention suitable for commercial fish-raising, a transparent shell may be mounted on the ground surface, the latter serving as a bottom support. The pumps are located in a suitable housing within the enclosed terrarium region. The water-bearing chambers in the larger-scale embodiment embrace the shell on three sides only, leaving one side unobstructed for access means to the interior of the apparatus.

There is located in the enclosed region of the larger-scale embodiment, a relatively high-volume heat-storage tank for storing and releasing heat, respectively, during daylight and night hours. This tank may take the form of a pond which is preferably heat-insulated from the ground surfaces in the terrarium. How heat is transferred to this pond, during daylight hours, and released therefrom during night hours, is illustrated schematically in FIG. 4. An aquarium chamber 124 in this figure is connected to a pump 126 by a conduit 128. A coiled portion of the conduit extends through a tank 130, where heat exchange between the conduit and water in the tank occurs. Water from pump 126 is returned to chamber 124 through a valve 132 which is operable to return water in a stream to the chamber through a conduit 134 or as a spray through a spray nozzle 136.

During daylight hours solar energy is absorbed by water in aquaria chambers, such as chamber 124, with a portion of this heat being transferred by heat exchange to water in tank 130. Below a preselected maximum temperature, water is returned to the chambers through conduits, such as conduit 134, in a stream. If the water reaches a maximum allowed temperature, the water is returned to the tanks through a spray nozzle, such as nozzle 132, to reduce water temperature by evaporate cooling. During night hours heat flow between the aquaria chambers and tank 130 is reversed, as described above.

From the foregoing, it can be seen how various objects of the invention are met. In the smaller-scale embodiment of the invention, a plurality of water-bearing chambers are mounted on a shell forming a terrarium. Water in the chambers is circulated through conduits in heat-exchange relationship with a soil layer in the terrarium to equalize aquarium and terrarium temperatures. The aquaria chambers and the soil layer are both substantially insulated from the supporting ground layer to reduce heat loss thereto.

Different salt and nutrient conditions can be maintained in each of the different aquaria chambers. Water in each chamber is filtered by filter units which are arranged end-to-end in the bottom of the chamber, and which are easily removed for cleaning or replacement.

In a larger-scale embodiment of the invention suitable for commercial use, the apparatus is provided further with a heat reservoir, such as a large-volume water pond, for storing heat collected during daylight hours.

While preferred embodiments of the invention have been described herein, it is apparent that changes and modifications may be made without departing from the spirit of the invention.

It is claimed and desired to secure by Letters Patent:

1. Terrarium/aquarium apparatus comprising in operative condition,
   a bottom support,
   a light-transmissive shell mounted on said support, forming therewith a substantially moisture-tight enclosure, said shell having a detachable crown,
   a plant growth medium contained within said enclosure,
   a pair of vertically spaced, light-transmissive jackets mounted on said shell, providing therewith surfaces defining a pair of water-bearing chambers for raising fish, and
   for each chamber, water circulating means including a pump, conduit means connecting said pump and the associated chamber, and extending through said medium in heat-exchange relationship therewith, and nozzle means mounted on said shell above the associated chamber for directing water into the same.

2. A solar-heated fish-raising facility comprising
   a ground support,
   a light-transmissive shell mounted on said support, forming a substantially moisture-tight enclosure over said support,
   a water-bearing tank located within said enclosure, with water in said tank being substantially insulated from said support,
   a jacket mounted on said shell, forming therewith on the outside thereof, a water-bearing chamber, and
   means for circulating water held in said chamber, said means including conduit means disposed in heat-exchange relation with water in said tank, a pump connected to said conduit means for pumping water therethrough, a return conduit and a spray device through which water can be returned from said conduit means in stream and spray form, respectively, to said chamber, and a valve operable to direct water from said pump to said spray device or said return conduit.

* * * * *